INVENTOR.
John S. Wroby

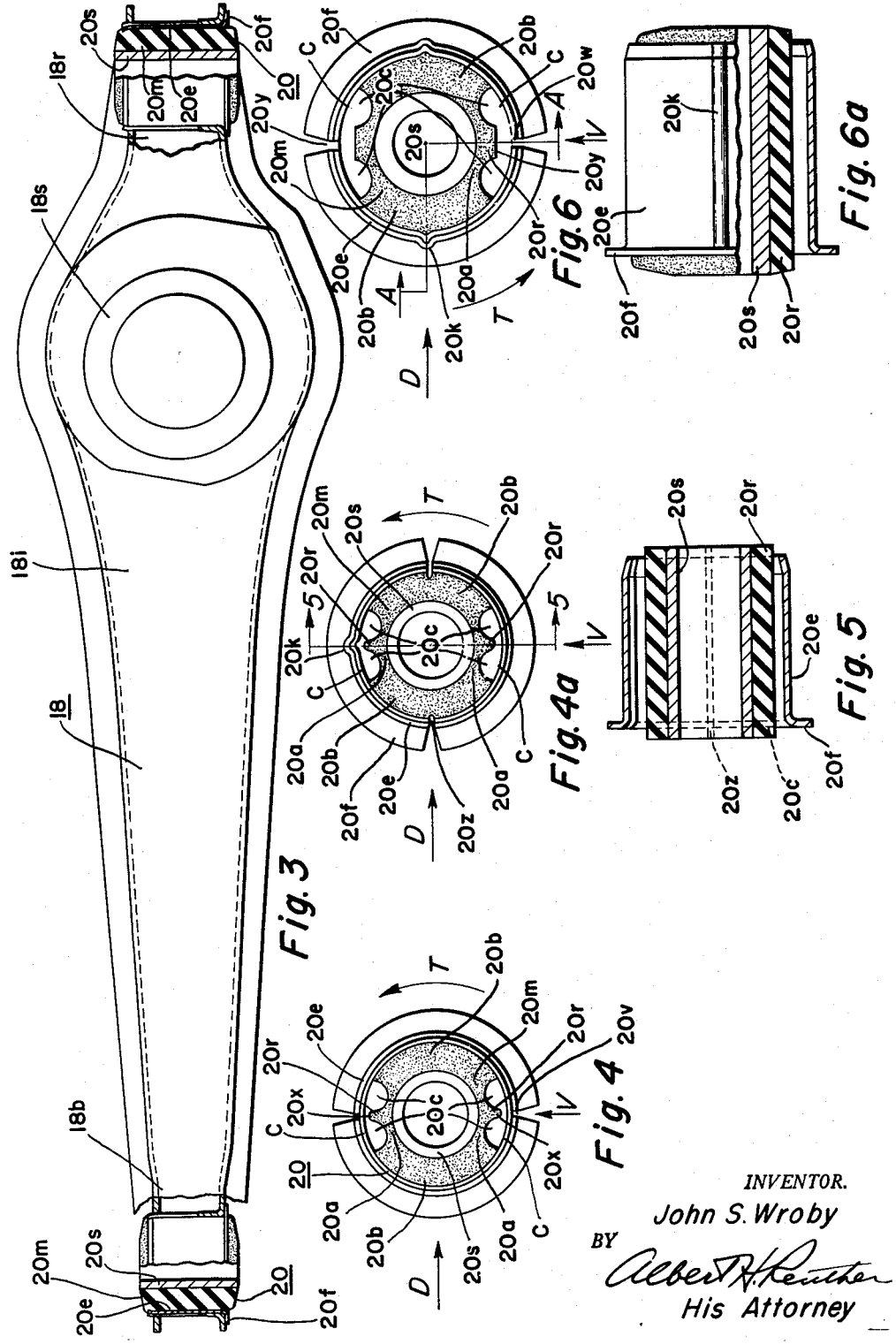

United States Patent Office 2,989,330
Patented June 20, 1961

2,989,330
RESILIENT SUSPENSION MEANS
John Stan Wroby, Birmingham, Mich., assignor to General Motors Corporation, Detroit, Mich., a corporation of Delaware
Filed Nov. 16, 1959, Ser. No. 853,164
10 Claims. (Cl. 287—85)

This invention relates to bushing means and particularly to shock absorption between components such as suspension control arms relative to vehicle mounting parts.

An object of this invention is to provide a new and improved mounting means having an elastomeric portion whereby there is permitted a more reliable control of movement including moderate flexibility in fore-aft directions and significantly higher flexibility vertically while minimizing conical and torsional deflection thereof. Another object of this invention is to provide a multiple radial rate bushing including concentrically spaced shell or sleeve members between which there is provided an elastomeric means having at least a single cavity in a vertical plane so as to have a rate of shock absorption lower in a vertical direction than in lateral or fore and aft directions.

Another object of this invention is to provide a multiple radial rate bushing as insulating means against noise and shock forces that occur between unsprung masses such as undercarriages as well as axles and sprung masses such a bodies as well as frame structure and that are absorbed at a relatively soft vertical rate with a relatively low natural frequency in the direction of disturbance by elastomeric material in shear whereas in a fore and aft direction there is a relatively harder or higher rate of absorption relying on the same elastomeric material in compression.

A further object of this invention is to provide a bushing joint for a vehicle having a sprung mass supported relative to an unsprung mass by linkage including resilient mounting means which can isolate and avoid transmission of vibration noise and harsh shocks due to disturbances affecting the unsprung mass by use of a preformed elastomeric portion or body of this resilient material has at least one cavity therein with respect to inner and outer mounting members such that the preformed portion or body of resilient material provides moderate flexibility in one direction transverse to an axis through the body with resilient material under compression and significantly higher flexibility in another direction also transverse to the same axis through the body with resilient material in shear to provide vibration isolation at a relatively low natural frequency in response to the disturbance force whereby transmissibility thereof is reduced and simultaneously there is relative rotational freedom about a transverse axis; this rotational freedom is to be usually in a range, for example, between plus and minus 20 degrees to accommodate geometry of pivot action resulting from movement of sprung and unsprung masses relative to each other in the direction having low frequency response as well as relative "conical" freedom about the longitudinal axis usually in a range, for example, between plus and minus 3 degrees to accommodate any roll of the sprung mass relative to the unsprung mass.

Another object of this invention is to provide a coaxial cylindrical isolation mount used as a pivot bushing having multiple radial rates of vibration and shock absorption occurring in a location between suspension control arms relative to an unsprung mass such as an axle and a sprung mass such as a vehicle body or frame by way of a resilient mounting means having a pair of concentric sleeves between which there is a preformed elastomeric portion; this preformed elastomeric portion a pair of radially outwardly extending segments in alignment with each other in a first axis transverse to a longitudinal common axis of the concentric sleeves and separated at least in part by first and second cavities adjacent to the outer sleeve in a second axis transverse to both the first and longitudinal axes and joined in part by semi-annular sections of elastomeric material adjacent to the inner sleeve; also each section has at least one snubber rib or bumper means extending radially outwardly in part into each cavity and adapted to engage an inner periphery of the outer shell for limiting excessive deflections which may occur as a result of abnormally high vertical loads as axle-journalled wheels strike road bumps to cause occurrence of road noise, harshness and road-excited disturbances on tires of the wheels occurring during normal-load vehicle operation which would be transmitted through the suspension control arm to body structure and then acoustically into a passenger compartment of the body; however there is control thereof by resilient material of segments in shear for providing a "soft" vertical rate having a low natural frequency in the direction of disturbance whereby the transmissibility, and thus road noise as well as harshness, can be reduced; also simultaneously there is relative fore-aft rigidity with resilient segments under compression to minimize high torque axle wind-up and adverse handling and stability characteristics due to axle track steer and simultaneously a reduction of torsional rate of the pivot bushing about its own axis for a predetermined fore-aft radial stiffness as the lower torsional rate reduces any undesirable influence of the bushing on the suspension rate; this will permit more reliable control of suspension rate characteristics by spring rate design in conjunction with relative rotational freedom about a transverse axis to accommodate the geometry of pivot action resulting from vertical motions of wheel and axle and also conical freedom about the longitudinal axis to accommodate roll of the body and/or frame relative to the axle due to vehicle cornering.

Further objects and advantages of the present invention will be apparent from the following description, reference being had to the accompanying drawings wherein preferred embodiments of the present invention are clearly shown.

In the drawings:

FIGURE 3 is a partially-sectioned plan view of the suspension control link or arm of the system in FIGURES 1 and 2.

FIGURE 4 is an end view of bushing means in accordance with the present invention.

FIGURE 4a is an end view of a modification of the bushing means in accordance with the present invention.

FIGURE 5 is a cross-sectional elevational view taken along line 5—5 in FIGURE 4a.

FIGURE 6 is an end view of another embodiment of bushing means in accordance with the present invention.

FIGURE 6a is a cross-sectional elevational view taken along line A—A in FIGURE 6.

Figure 1:
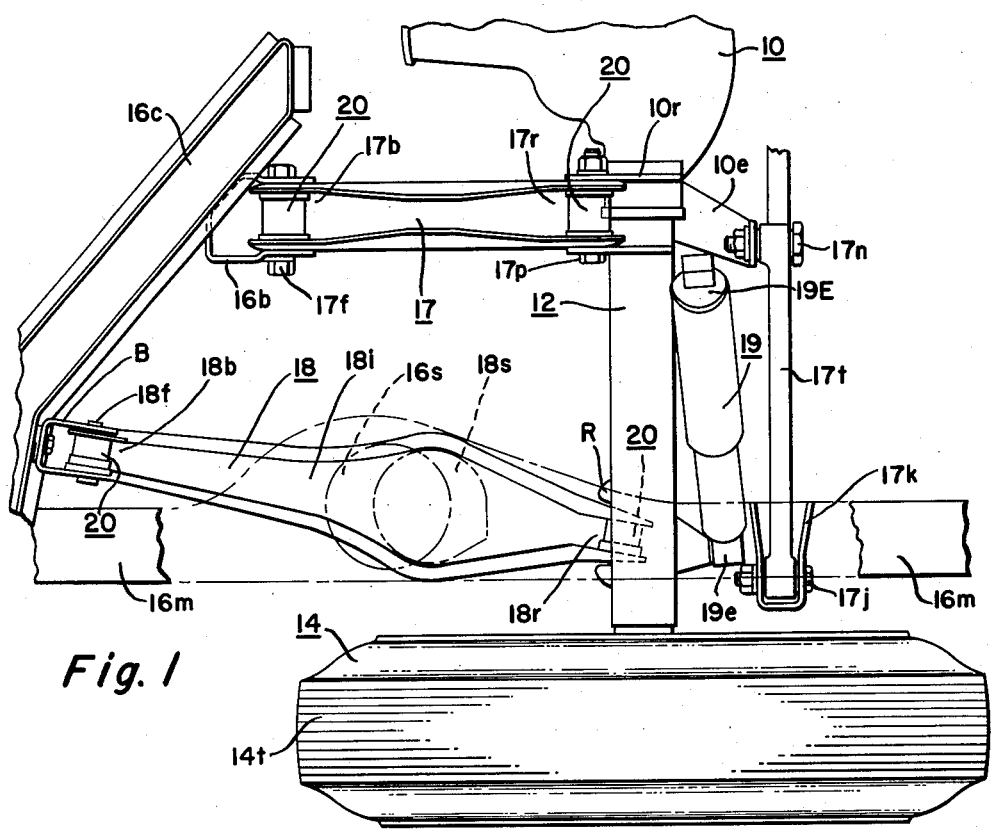
FIGURE 1 is a fragmentary plan view of a vehicle suspension system including mounting means in accordance with the present invention.

In FIGURE 1 there is provided a fragmentary plan view of a rear suspension system on a motor vehicle. The vehicle includes an unsprung mass such as a rear differential housing generally indicated by numeral 10, a rear axle housing generally indicated by numeral 12 and a wheel generally indicated by numeral 14 and having a tire 14t mounted thereon and adapted to be rotated about an axis of an axle 12a relative to which the wheel is journalled in a well known manner in driving engagement therewith. The axle 12a is visible in the view of FIGURE 2 as is the differential housing 10 and a drive shaft 10d and universal joint 10j connected therebetween.

Figure 2:
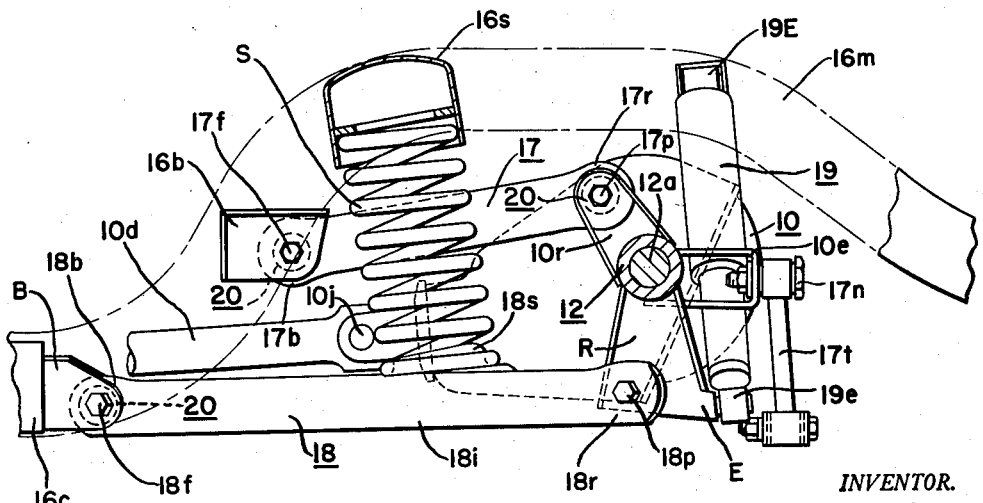
FIGURE 2 is a fragmentary side view of the suspension and mounting of FIGURE 1.

The vehicle also includes a sprung mass such as a unitized body or body and frame combination which is resiliently supported and carried relative to the unsprung mass. For purposes of illustration, there is shown in FIGURES 1 and 2 a phantom outline of certain frame-body components of the sprung mass including a main frame member 16m extending longitudinally with respect to the vehicle body as well as a cross piece 16c of the frame.

The suspension system includes several arms or control links pivotally secured at opposite ends relative to the sprung and unsprung masses. The specific arrangement of suspension control arms can be varied as required. In predetermined locations there are provided brackets or mounting members which can be bolted or welded into engagement with the sprung and unsprung masses respectively. For example, a front bracket 16b is secured to the cross piece 16c of the frame and a rear bracket 10r is secured to the unsprung mass including the axle housing 10. This rear bracket can include a lateral extension 10e extending radially away from the axle housing and differential housing as seen in FIGURES 1 and 2. An upper arm or control link 17 having ends 17b and 17r can be journalled or pivotally attached at opposite ends with the front bracket 16b and rear 16r respectively. Suitable nut and bolt means form a front pivot pin 17f and rear pivot pin 17p with respect to the front and rear ends and brackets respectively. Another nut and bolt means 17n serve as a pivot for a track bar 17t which is also pivotally journalled by a nut and bolt means 17j with respect to a frame bracket 17k attached in a suitable location relative to the main frame member 16m visible in FIGURE 1.

The main frame member 16m also has a mounting means or upper spring seat 16s secured thereto such as by welding. This spring seat 16s provides a socket for support for one end of a spring means S that has an opposite end positioned in engagement with an embossed mounting or lower spring seat 18s provided along an intermediate portion 18i of a lower arm or control link generally indicated by numeral 18. The lower arm or control link 18 has a front pivot portion 18b as well as a rear pivot portion 18r journalled by a front pivot pin means 18f and a rear pivot pin means 18p with respect to a front frame bracket B and a rear frame bracket R respectively. The front frame bracket B is attached as by welding relative to the frame or as shown in FIGURE 1 is attached by a suitable bolt relative to the cross piece 16c of the frame. The rear bracket R is welded or otherwise suitably secured to the rear axle 12 along the outer periphery of the housing thereof and includes an extension E to which an end 19e of a shock absorber means generally indicated by numeral 19 is journalled. An opposite end 19E of the shock absorber is suitably secured to a vehicle body and/or frame of the sprung mass in a well known manner. Details of the shock absorber 19 can vary and an example thereof can be found in Patent 2,537,-424—Rossman belonging to the assignee of the present invention.

Each of the pivot pins 17f, 17p, 18f and 18p is fitted axially and concentrically inside an internal sleeve 20s of a bushing or mounting means generally indicated by numeral 20 in views of FIGURES 1, 2, 3, and 4. The lower arm or control link 18 is illustrated separately in the plan view of FIGURE 3 to facilitate understanding of the structure involved. Each bushing or mounting means 20 includes an external sleeve 20e having a radially extending flange 20f integral therewith and in addition to the internal sleeve 20s concentrically and coaxially spaced therefrom by an elastomeric means of resilient material 20m. This resilient material is cured and bonded in place relative to the internal sleeve 20s and external sleeve or shell 20e and has a predetermined structural relationship with the internal and external sleeves in accordance with the present invention. Natural rubber as well as synthetic rubber-like materials and compounds thereof are used as resilient material for the elastomeric portion 20m. Previously known bushings have provided elastomeric material adapted to provide no combination of rates in varying directions radially in between the internal and external sleeve shells. In accordance with the present invention there is provided the elastomeric portion 20m having multiple radial rates as governed by more reliable control of movement and transmission of forces with respect to pivotal pins journalling sprung and unsprung masses relative to each other by means of suspension system control links as described earlier. predetermined structure of the elastomeric portion for The specific configuration of the elastometric means 20m includes a preformed elastomeric portion or body of resilient material indicated by the reference numeral 20m having at least one cavity therein with respect to inner and outer mounting members or sleeves such that the preformed portion or body of resilient material provides moderate flexibility in one direction transverse to an axis through the body of resilient material under compression. This moderate flexibility or relative rigidity is afforded by diametrically opposite body portions 20b which are adapted to absorb vibration and shock with the elastomeric material under compression in response to fore and aft forces or deflections represented by an arrow D in each of the views of FIGURES 4, 4a, and 6. These portions adapted to absorb disturbances under compression can be referred to as a pair of radially outwardly extending segments diagonally in alignment with each other in a first axis substantially transverse to a longitudinal common axis of the concentric internal and external sleeve and coinciding with the axis of each pivot pin. Thus, the first transverse axis passes substantially through the radially solid elastomeric material in the first pair of segments located substantially transverse to the longitudinal common axis of the pivot pin as well as the concentric sleeves or mounting members. In the illustrations of FIGURES 4, 4a and 6 there are shown cavities generally indicated by reference C each including half portions of space 20c separated in part from each other by a snubber rib or bumper means 20r extending radially outwardly and integral with semi-annular sections 20a of elastomeric material adjacent to the inner sleeve 20s. These semi-annular sections 20a are integral at diametrically opposite locations with the segments or body portions adapted to be in compression and identified by reference numeral 20b. The snubber rib or bumper means 20r extend radially outwardly in part into each cavity C and an apex portion 20x or flat portion 20y shown by FIGURES 4–4a and FIGURE 6 respectively are adapted to engage an inner peripheral surface of external sleeve or mounting member 20e for limiting excessive deflection which may occur as a result of abnormally high vertical loads transmitted by way of tires such as 14t of the wheels such as 14 by way of the axle to the suspension system linkage. Force of vertical loads or deflection is represented by an arrow V in each of the views of FIGURES 4, 4a and 6. Due to presence of one or more cavities such as C in locations spaced radially away from the internal sleeve or mounting member 20s there is greater flexibility of the elastomeric means 20m vertically with the resilient material of segments 20b in shear for a relatively soft rate and greater flexibility than encountered in response to forces in a fore and aft direction represented by arrow D, for example, in each of the views. The fore-aft rigidity provided by segments 20b in compression serves to minimize high torque axle wind up noise and vibration transmission from the unsprung mass to the sprung mass and also serves to minimize any difficulty or adversity in handling or steering of a vehicle in a predetermined direction or track established by the tread of the tires or wheels. The vehicle can be controlled and steered with greater stability due to increased fore-aft rigidity and yet road noise, vibrations and harshness of forces transmitted from the wheels by way of the axle to the suspension system can be effectively damped and controlled with resilient material in shear to provide a "soft" vertical rate for vibration isolation in the elastomeric means 20m. Thus, with respect to vertical forces there is a relatively low natural frequency and resistance to absorption of vibration and shock in a direction of the disturbance vertically whereby the transmissibility and thus the road noise perceptible in a passenger compartment of a body of a vehicle is reduced.

Further advantages of the present invention concern conical or torsional rates as well as rotational freedom relative to the elastomeric means 20m of the bushing in accordance with the present invention. The relationship of segments 20b as well as semi-annular sectors 20a with and without bumpers or ribs 20r is such that the resilient material accommodates geometric pivotal action resulting from vertical motion of wheel and axle relative to suspension system linkage and the sprung mass such that there is rotational freedom about the transverse axis in a range of, for example, plus and minus twenty degrees. Further, there is "conical" freedom relative to the longitudinal axis in a range, for example, between plus and minus three degrees permitting movement to accommodate roll of the body-frame relative to the axle due to vehicle cornering. The torsional rate of the bushing about its own axis involves a force represented by arrows T in views of FIGURES 4, 4a and 6. This torsional rate of the bushing is reduced for a given fore-aft radial stiffness. The lower torsional rate reduces any undesirable influence of the bushings on the suspension system rate and thus permits more reliable control of the suspension system rate characteristics in accordance specifically with spring rate design for the coil spring such as S for example. Road noise and harshness are presumed to be caused by substantially vertical, road excited, disturbances on a tire such as 14t occurring during normal-load car operation. These vertical forces or excitations are transmitted through the suspension arms to the structure of a vehicle body and then acoustically into a passenger compartment of a body. Since the control arm bushings are in the path of transmitted disturbance, the resilient material such as rubber in shear provides a relatively higher flexibility and softness for vibration isolation and absorption with the relatively low natural frequency in the direction of the disturbance. Whereas previously rates of absorption in bushings have been uniform in all radial directions or at best one and one-half times the rate in one direction over another, actual tests on the bushings of the present invention show that it is possible to obtain a differential in rates in different radial directions in the order of three to four times in magnitude for variation with respect to fore-aft forces and vertical forces, for example.

The views of FIGURES 4, 4a and 6 show a dual cavity arrangement which would have one fore and aft rate and a different vertical rate. It is to be understood that the bushing in accordance with the present invention could also be made with a single cavity in the vertical plane rather than two cavities at 180° apart. In such a single cavity structure, the vertical rate would not be as low in the vertical plane as it would be with the dual cavity arrangement.

The view of FIGURE 5 represents a cross-sectional elevational view of the bushing having no flat surface for the rib 20r and having a slightly modified external mounting or sleeve member in that a split portion 20z in the external sleeve is located centrally relative to the segments 20b whereas in the view of FIGURE 4 the split portion represented by reference numeral 20v is located centrally relative to each cavity C. The cross-sectional view of FIGURE 6 also shows the split 20W in a location adjacent to each cavity C but having a greater width.

Thus the flat surface 20y is provided in the rib or bumper means 20r in the embodiment of FIGURES 6 and 6a. The split outer-shell or sleeve structure permits installation of bushing means in accordance with the present invention in a manner such that the resilient material of segments 20b can be pre-compressed and pre-loaded upon installation of the bushing means relative to a pivot pin and end of a control link or arm such as 18. Pre-loading or pre-compressing of resilient material serves to enhance retention of "life" of material such as rubber. A key way such as 20k shown in views of FIGURES 4a and 6 is provided for assembly of bushing means in accordance with the present invention in a proper and predetermined position such that the cavities such as C are located in the vertical plane for proper functioning and control of forces in lateral as well as vertical directions. With the split external sleeve arrangement there are in effect two half shells for the outer mounting means as shown in the views of the drawings. The elastomeric portion 20m is not coextensive with both of the metallic sleeves due to presence of the cavity, segment, and sector structures described above.

While the embodiments of the present invention as herein disclosed constitute preferred forms, it is to be understood that other forms might be adopted.

What is claimed is as follows:

1. For use in a vehicle suspension system including control links pivotally mounted between sprung and unsprung masses, a mounting joint, comprising, an internal mounting member, an external mounting member in predetermined spaced position relative to said internal member, and an elastomeric portion between said members and including a resilient material under compression for limited flexibility of movement of the internal and external members relative to each other in response to force in fore and aft directions transverse to a longitudinal direction common to said internal and external members as well as said elastomeric portion, said elastomeric portion having at least one cavity therein adjacent to said external member and in a plane transverse to the fore and aft direction, said cavity having full axial length and depth such that there is significantly higher flexibility in this plane with resilient material purposely in shear, said elastomeric portion being carried adjacent to the pivotal mounting of the control links.

2. A multiple radial rate bushing for use as insulating means against noise and shock forces that occur between sprung and unsprung masses, comprising, an internal mounting member, an external mounting member in predetermined spaced relationship with said internal member, and an elastomeric portion molded between said internal and external members, such that main body segments thereof are resiliently and fully under compression, though having cavity-forming means extending fully axially therebetween in a location substantially transverse to a first direction in which said main body segments are under compression, such that said main body segments isolate noise and shock forces by having said elastomeric portion segments in shear in a second direction as movement in the second direction is permitted with significantly higher flexibility while minimizing conical and torsional deflection of members relative to each other, due to control of movement by said elastomeric portion and cavity forming means.

3. A multiple radial rate bushing of claim 2 wherein said elastomeric portion includes semi-annular sections adjacent to said internal mounting member and provided to join said main body segments while forming a pair of cavities located diametrically opposite each other in confines established by said semi-annular sections, a pair of said main body segments and said external member.

4. A bushing joint for a vehicle having a sprung mass such as a body, frame and the like supported by a spring between control links pivotally journalled at opposite ends relative to the sprung mass and unsprung mass such as an axle and the like, comprising, inner and outer mounting sleeves concentrically spaced relative to each other, and preformed body portion of resilient material having at least one cavity therein extending fully axially with respect to said sleeves between which a radially oppositely extending main segmental means is provided to afford moderate flexibility in response to force in a first direction whereby the resilient material is under compression, said segmental means of said elastomeric portion also affording significantly higher flexibility in response to force in a second direction whereby the resilient material is in shear, while said resilient material provides relative freedom for movement torsionally as well as coaxial-conical telescopically of said inner and outer sleeves relative to each other in response to shifting of the sprung mass relative to the unsprung mass due to direct as well as rolling movement thereof relative to each other.

5. The bushing joint of claim 4 wherein said elastomeric portion is pre-compressed in said segmental means due to diametrically opposite splitting of said outer sleeve which is keyed in a predetermined position adjacent to a location where the links are pivotally journalled such that said segmental means are affected by forces in a fore and aft direction and the cavity is located in a vertical plane.

6. The bushing joint of claim 4 wherein said segmental means are located to affect force in a fore and aft direction and are joined by semi-annular sectors adjacent to said inner sleeve in locations radially in alignment with a pair of cavities formed by the resilient material relative to said outer sleeve.

7. A coaxial cylindrical isolation mount used as a pivot bushing having multiple radial rates of vibration and shock absorption occurring in a location between vehicle suspension control arms relative to an unsprung mass such as an axle and a sprung mass such as a vehicle body, frame and the like, comprising a pair of concentrically-spaced sleeves, a preformed elastomeric portion between said sleeves and including a pair of radially outwardly extending segments in alignment with each other in a first axis transverse to a longitudinal common axis of the concentric sleeves, a pair of semi-annular sections of elastomeric material joining said segments and forming a pair of axially extending cavities located radially outwardly from said sections, and snubber rib means extending radially outwardly in part into each cavity and adapted to engage an inner periphery of one of said concentric sleeves for limiting excessive deflections which may occur as a result of abnormally high vertical loads, said elastomeric portion having said segments under compression to afford moderate rate of flexibility in a fore and aft direction, while said same segments in shear afford significantly greater flexibility with respect to vertical movement of the sprung mass and unsprung mass relative to each other.

8. The mount of claim 7 wherein said sleeve adjacent to each cavity has a split to permit radial predetermined pre-compressing of said segments.

9. The mount of claim 7 where said rib means has a flat radially outer surface along each cavity and having a width for bridging a split in said sleeve in a location adjacent to each cavity.

10. In a bushing of elastomeric material for use as insulating means against multi-directional noise and shock forces that occur between sprung and unsprung masses having internal and external mounting members in predetermined spaced relationship, the improvement which comprises having a single elastomeric means mainly under full and resilient compression though having at least one major cavity extending fully axially therein adjacent to one of the mounting members, said same elastomeric means having greater resilience in response to force applied between the members only in a direction substantially radially in alignment with the cavity which assures reaction to force in one direction by shear of said elastomeric means though in a second direction there can be only compression and greater rigidity in opposition to radial force between the mounting members, said same elastomeric means also providing relative freedom for movement torsionally as well as coaxial-conical telescopically between the internal and external mounting members, said single elastomeric means providing multiple-radial-rates of vibration and shock absorption between the members.

References Cited in the file of this patent

UNITED STATES PATENTS

| | | |
|---|---|---|
| 1,786,717 | Moore et al. | Dec. 30, 1930 |
| 1,958,119 | Tarr | May 8, 1934 |
| 2,004,712 | Thiry | June 11, 1935 |
| 2,062,290 | Bott | Dec. 1, 1936 |
| 2,235,605 | Bugatti | Mar. 18, 1941 |
| 2,422,327 | Winslow | June 17, 1947 |
| 2,562,381 | Goldsmith | July 31, 1951 |
| 2,819,105 | Behnke | Jan. 7, 1958 |